US012281589B2

(12) United States Patent
Foresto

(10) Patent No.: US 12,281,589 B2
(45) Date of Patent: Apr. 22, 2025

(54) INTERMEDIATE CASING FOR A GAS TURBINE ENGINE

(71) Applicant: SAFRAN AIRCRAFT ENGINES, Paris (FR)

(72) Inventor: Paul Antoine Foresto, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 8 days.

(21) Appl. No.: 17/916,333

(22) PCT Filed: Apr. 1, 2021

(86) PCT No.: PCT/FR2021/050580
§ 371 (c)(1),
(2) Date: Sep. 30, 2022

(87) PCT Pub. No.: WO2021/198624
PCT Pub. Date: Oct. 7, 2021

(65) Prior Publication Data

US 2023/0220786 A1 Jul. 13, 2023

(30) Foreign Application Priority Data

Apr. 1, 2020 (FR) ....................................... 2003275

(51) Int. Cl.
*F01D 25/26* (2006.01)
*F01D 5/14* (2006.01)
*F01D 9/06* (2006.01)

(52) U.S. Cl.
CPC ............. *F01D 25/26* (2013.01); *F01D 5/143* (2013.01); *F01D 9/065* (2013.01);
(Continued)

(58) Field of Classification Search
CPC .......... F01D 5/143; F01D 9/065; F01D 25/24; F01D 25/26; F05D 2240/14; F05D 2250/10; F05D 2250/73
See application file for complete search history.

(56) References Cited

U.S. PATENT DOCUMENTS 8,444,378 B2 * 5/2013 Clemen ..................... F02K 3/06 415/220
9,732,674 B2 * 8/2017 Sakamoto ............... F01D 25/30
2018/0306041 A1 10/2018 Peters et al.

FOREIGN PATENT DOCUMENTS

EP 2 233 726 A2 9/2010
EP 3 348 820 A1 7/2018
FR 3 064 298 A1 9/2018

OTHER PUBLICATIONS

International Search Report and Written Opinion of the International Searching Authority dated Jul. 6, 2021 in International Application No. PCT/FR2021/050580.

(Continued)

*Primary Examiner* — David E Sosnowski
*Assistant Examiner* — Jason G Davis
(74) *Attorney, Agent, or Firm* — Sughrue Mion, PLLC

(57) ABSTRACT

An intermediate casing includes an inner wall having an outer surface extending along a longitudinal axis, the outer surface having a first profile in a first plane, an outer wall having an inner surface a second profile in the first plane, and first through fourth arms each extending radially. The outer and inner surfaces and the first and second arms delimit a first cavity, the first cavity having a first area and the outer and inner surfaces being separated by a first distance. The outer and inner surfaces and the third and fourth arms delimit a second cavity, the second cavity having a second area and the outer and inner surfaces being separated by a second distance. The first and second profiles
(Continued)

are such that the first area is substantially identical to the second area and the first distance is different from the second distance.

10 Claims, 7 Drawing Sheets

(52) U.S. Cl.
CPC ...... *F05D 2240/14* (2013.01); *F05D 2250/10* (2013.01); *F05D 2250/73* (2013.01)

(56) References Cited

OTHER PUBLICATIONS

French Search Report dated Nov. 10, 2020 issued by the French Patent Office in French Application No. 2003275.

* cited by examiner

INTERMEDIATE CASING FOR A GAS TURBINE ENGINE

CROSS REFERENCE TO RELATED APPLICATIONS

This application is a National Stage of International Application No. PCT/FR2021/050580 filed Apr. 1, 2021, claiming priority based on French Patent Application No. 2003275 filed Apr. 1, 2020, the contents of each of which being herein incorporated by reference in their entireties.

FIELD OF THE INVENTION

The invention relates to an intermediate casing for a gas turbine engine.

The invention applies more specifically to the profile of the radial surfaces of the walls of an intermediate casing for a gas turbine engine, and a method for manufacturing an intermediate casing for a gas turbine engine.

PRIOR ART

With reference to FIGS. 1 to 3, a known intermediate casing 1 from the prior art is a structural part of a gas turbine engine, interposed between two rotors (not shown) of the gas turbine engine, said rotors being configured to be rotated at different speeds. Typically, an intermediate casing generally extends between the low-pressure compressor and the high-pressure compressor of a two spool, double flow, direct drive gas turbine engine. In a three-spool gas turbine engine or in a geared gas turbine engine, an intermediate casing generally extends between the fan and the low-pressure compressor.

In any case, the intermediate casing 1 allows slowing the airflow between the two rotors. To this end, as can be seen in FIGS. 1 and 2, it generally has a gooseneck (or swanneck) structure in which the passage cross section of the airflow at the inlet of the intermediate casing 1 is smaller than the passage cross section of the airflow at the outlet of the intermediate casing.

In addition, the intermediate casing 1 comprises a plurality of arms 2 extending between the inner radial wall 3 and the outer radial wall 4 of the intermediate casing 1, and having an aerodynamic profile. The arms 2 allow forces to transit to the structural and stator portions of the gas turbine engine, typically from bearings of the low-pressure shaft to the fan casing (not shown). Moreover, the arms 2 form an aerodynamic fairing for passing utilities 5 (e.g. drain, mechanical compressor driveshaft, rotation sensor) extending between the inner radial portion and the outer radial portion of the gas turbine engine.

However, the utilities 5 do not all have the same bulk. Consequently, as can be seen in particular in FIG. 3, the arms 2 of the intermediate casing 1 do not all have the same thickness. Moreover, the position of the maximum thickness, along the chord of the aerodynamic profile, can also differ from one arm 2 to another. This position can also be determined during design in order to reduce pressure losses induced by the arms 2 or to limit the distortion induced on one of the rotors.

Finally, the shape of the inner radial wall 3 and of the outer radial wall 4 is identical, and symmetrical, over the entire intermediate casing 1. In fact, as can be seen in FIG. 3, the walls 3, 4 are generally designed with a circular cross section.

However, the heterogeneity of the aerodynamic profiles of the arms 2, in terms of the maximum thickness and the position of this maximum thickness, causes heterogeneity of the passage cross sections for the airflow between the different arms 2 of the intermediate casing 1. Thus, in FIG. 3, a first cross section has an area A1 greater than a second cross section, itself having an area A2 greater than the area A3 of a third cross section. But such heterogeneities are harmful to the aerodynamic quality of the airflow through the intermediate casing 1, particularly as regards pressure losses.

The current design of the walls 3, 4 of the intermediate casing 1 is insufficient in this regard. In fact, it allows only controlling the slowing of the airflow at the arm 2, the maximum thickness of which is near the mean of the maximum thicknesses. To this end, it provides for uniformly hollowing the outer wall 4 of the intermediate casing 1, at equal distance from the leading edges and the trailing edges of the arms 2, so as to avoid a re-acceleration of the flow. The depth of this hollowing depends systematically on the mean of the maximum thicknesses of the arms. Thus, the radius of the circular cross section of the walls 3, 4 depends on a mean maximum thickness of the arms 2 of the intermediate casing 1.

But such a design does not take into account arms 2, the maximum thickness of which is distant from the mean of the maximum thicknesses. Consequently, the flow is not controlled in the totality of the intermediate casing 1.

There is therefore a need to mitigate at least one of the disadvantages of the prior art described previously.

DISCLOSURE OF THE INVENTION

One of the objects of the invention is to improve the aerodynamic behavior of the flow within an intermediate casing.

Another object of the invention is to improve the specific fuel consumption of a gas turbine engine.

Another object of the invention is to improve the operability of a rotor arranged downstream of an intermediate casing.

In this regard, the invention has as its object an intermediate casing for a gas turbine engine, said intermediate casing:

having a longitudinal axis, comprising:

- an inner wall having an outer radial surface with respect to the longitudinal axis,
- an outer wall having an inner radial surface with respect to the longitudinal axis facing the outer radial surface, and
- a first arm, a second arm, a third arm and a fourth arm extending radially from the outer radial surface to the inner radial surface, and wherein:

- the outer radial surface, the inner radial surface, the first arm and the second arm define between them a first space having a first area in a first section plane of said intermediate casing, perpendicular to the longitudinal axis,
- the outer radial surface and the inner radial surface are separated, in the first space and in the first section plane, by a radial distance of the first space, with respect to the longitudinal axis,
- the outer radial surface, the inner radial surface, the third arm and the fourth arm define between them a second space having a second area in the first section plane,
- the outer radial surface and the inner radial surface are separated, in the second space and in the first section plane, by a radial distance of the second space with respect to the longitudinal axis, the intermediate casing being characterized in that the inner radial surface and/or the outer radial surface have, in the first section plane, suitable profiles so that:

the first area and the second area are substantially identical, and the radial distance of the first space and the radial distance of the second space are different.

In such an intermediate casing, each inter-arm surface has a profile adapted to the thickness of the adjacent arms, so that the flow is uniformly slowed through the entire intermediate casing. The result is homogeneity in the aerodynamic behavior of the flow through the intermediate casing, which improves the operability of a rotor arranged downstream of the intermediate casing and, as a result, the specific fuel consumption of the gas turbine engine.

Advantageously but optionally the intermediate casing according to the invention may further comprise at least one of the following features, taken alone or in combination:

in such an intermediate casing:

the first arm, the second arm, the third arm, and the fourth arm each have:

a plurality of thicknesses along the longitudinal axis, and a maximum thickness among said plurality of thicknesses, the first section plane passes through:

the first arm and the second arm at a respective maximum thickness of the first arm and of the second arm, and/or the third arm and the fourth arm at a respective maximum thickness of the third arm and of the fourth arm, in such an intermediate casing:

the first space has a third area in a second section plane of said intermediate casing, perpendicular to the longitudinal axis, and offset with respect to the first section plane along the longitudinal axis, the second space has a fourth area in the second section plane, the third area and the fourth area are substantially identical, and the inner radial surface and the outer radial surface have circular profiles in the second section plane, the profile of the inner radial surface has, in the first section plane, an additional concavity with respect to a circular profile, the profile of the outer radial surface has, in the first section plane, an additional concavity with respect to a circular profile, the second arm and the third arm are the same.

The invention also has as its object a gas turbine engine comprising a gas turbine engine casing as previously described.

Finally, the invention has as its object a method for manufacturing an intermediate casing for a gas turbine engine, said intermediate casing:

having a longitudinal axis, comprising:

an inner wall having an outer radial surface with respect to the longitudinal axis, an outer wall having an inner radial surface with respect to the longitudinal axis, facing the outer radial surface, and a first arm, a second arm, a third arm and a fourth arm extending radially from the outer radial surface to the inner radial surface, and wherein:

the outer radial surface, the inner radial surface, the first arm and the second arm define between them a first space having a first area in a first section plane of said intermediate casing, perpendicular to the longitudinal axis, the outer radial surface and the inner radial surface are separated, in the first space and in the first section plane, by a radial distance of the first space with respect to the longitudinal axis, the outer radial surface, the inner radial surface, the third arm and the fourth arm define between them a second space having a second area in the first section plane, the outer radial surface and the inner radial surface are separated, in the second space and in the first section plane, by a radial distance of the second space, with respect to the longitudinal axis, the manufacturing method being characterized in that it comprises a step of profiling the inner radial surface and/or of the outer radial surface so that, in the first section plane:

the first area and the second area are substantially identical, and the radial distance of the first space and the radial distance of the second space are different.

Advantageously but optionally, the manufacturing method according to the invention can further comprise at least one of the following features, taken alone or in combination:

the first arm, the second arm, the third arm and the fourth arm of the intermediate casing each have:

a plurality of thicknesses along the longitudinal axis, and a maximum thickness among said plurality of thicknesses, the method further comprising the step of:

forming of a first hollowing in the outer wall and/or in the inner wall, so that the outer radial surface and the inner radial surface are separated, in the first space and in the first section plane, by:

a first radial distance of the first space with respect to the longitudinal axis, the first radial distance of the first space extending from a point of the outer radial surface and/or from the inner radial surface outside of the first hollowing, and a second radial distance of the first space, with respect to the longitudinal axis, the second radial distance of the first space extending from a point on the outer radial surface and/or on the inner radial surface into the first hollowing, so that the gap between the first radial distance of the first space and the second radial distance of the first space is an increasing function of the gap between:

the maximum thickness of the first arm and/or of the second arm, and the mean of the respective maximum thicknesses of the first arm, of the second arm, of the third arm and of the fourth arm, and forming of a second hollowing in the outer wall and/or in the inner wall so that the outer radial surface and the inner radial surface are separated, in the second space and in the first section plane, by:

a first radial distance of the second space, relative to the longitudinal axis, the first radial distance of the second space extending from a point of the outer radial surface and/or of the inner radial surface outside of the second hollowing, and a second radial distance of the second space, relative to the longitudinal axis, the second radial distance of the second space extending from a point of the outer radial surface and/or from the inner radial surface passing through the second hollowing, so that the gap between the first radial distance of the second space and the second radial distance of the second space is an increasing function of the gap between:

the maximum thickness of the third arm and/or of the fourth arm, and the mean of the respective maximum thicknesses of the first arm, of the second arm, of the third arm and of the fourth arm, and in such a method:

the first hollowing is centered at a section plane passing through the first arm and the second arm at the respective maximum thickness of the first arm and of the second arm, and the second hollowing is centered at a section plane passing through the third arm and the fourth arm at the respective maximum thickness of the third arm and of the fourth arm.

DESCRIPTION OF THE FIGURES

Other features, objects and advantages of the invention will be revealed by the description that follows, which is purely illustrative and not limiting, and which must be read with reference to the appended drawings in which.

In all the figures, similar elements bear identical reference symbols.

DETAILED DESCRIPTION OF AN EMBODIMENT OF THE INVENTION

Intermediate Casing

Figure 1:
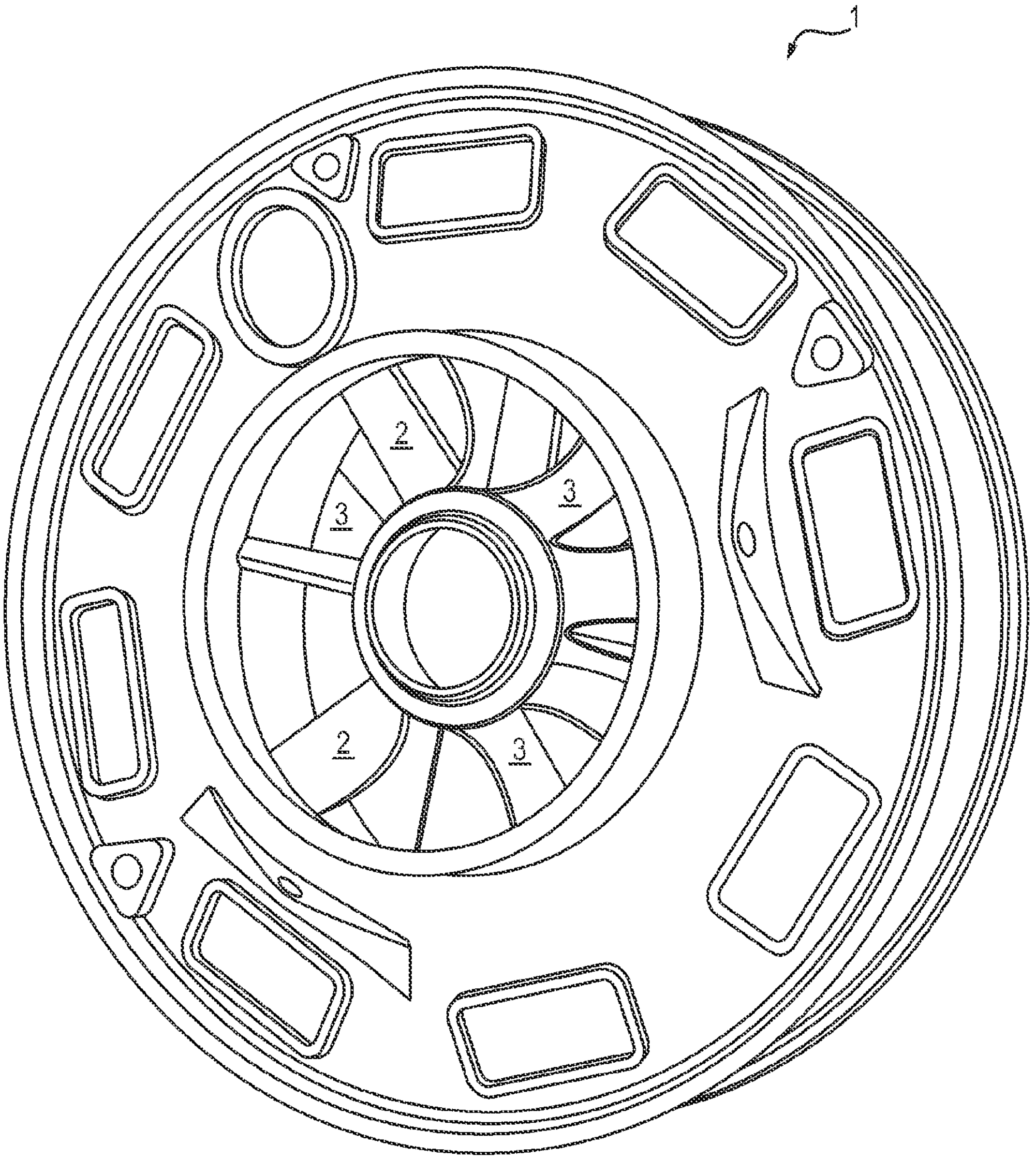
Prior Art FIG. 1
FIG. 1, already described, is a perspective view of a known intermediate casing from the prior art.
Figure 2:
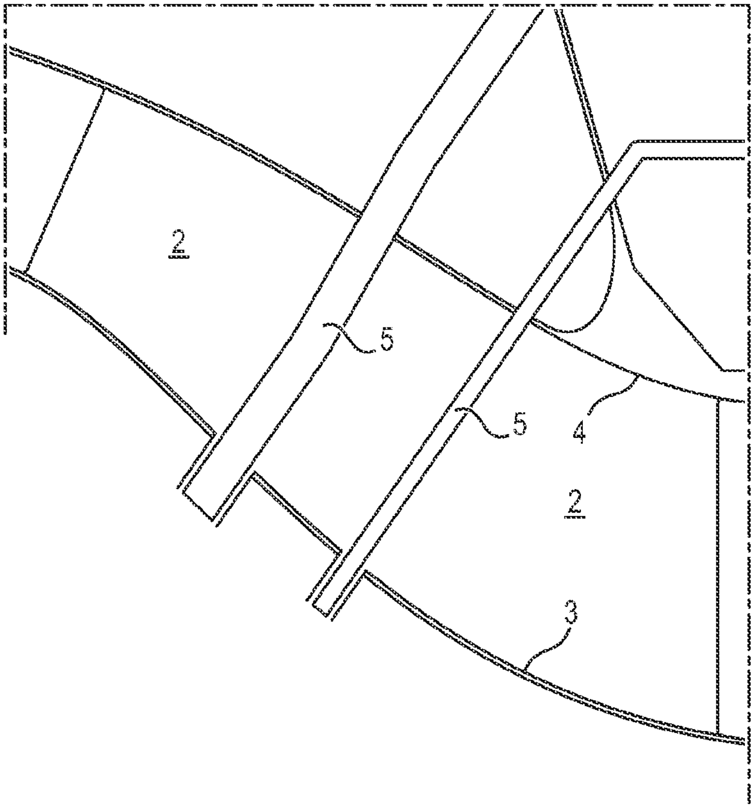
Prior Art FIG. 2
FIG. 2 is a longitudinal section view of the intermediate casing illustrated in FIG. 1.
Figure 3:
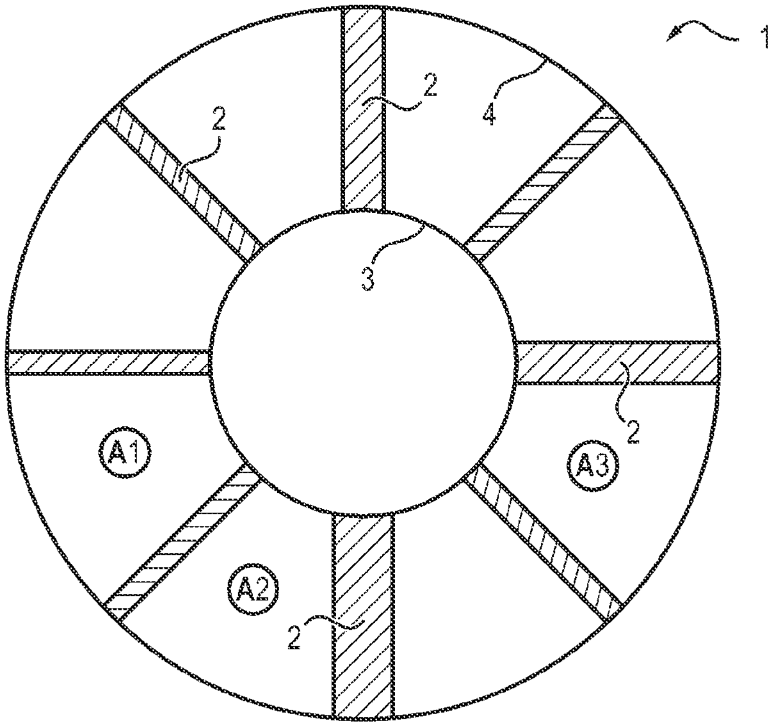
Prior Art FIG. 3
FIG. 3 is another transverse section view perpendicular to the longitudinal axis of the intermediate casing illustrated in FIG. 1.
Figure 4:
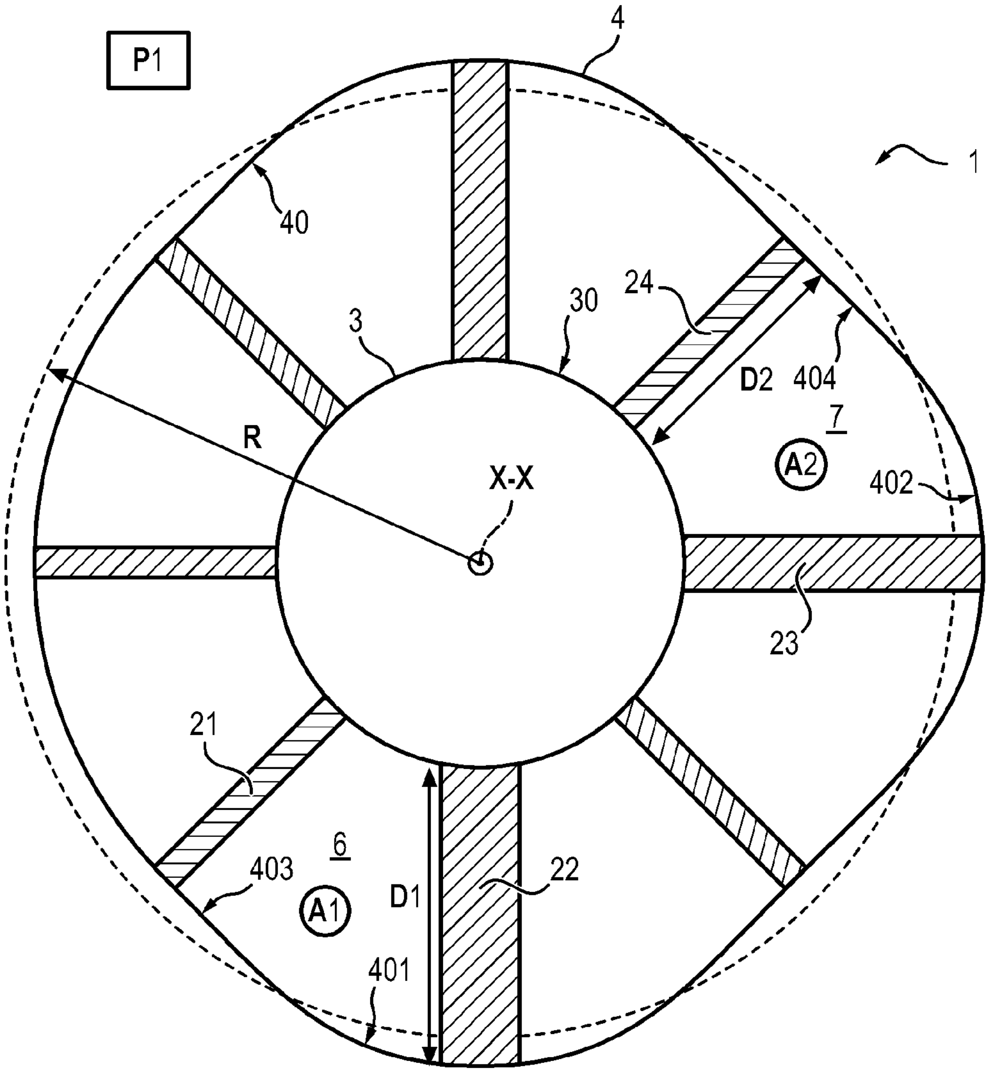
FIG. 4 is a view in a first transverse section plane perpendicular to the longitudinal axis of a first exemplary embodiment of a gas turbine engine intermediate casing according to the invention.
Figure 5:
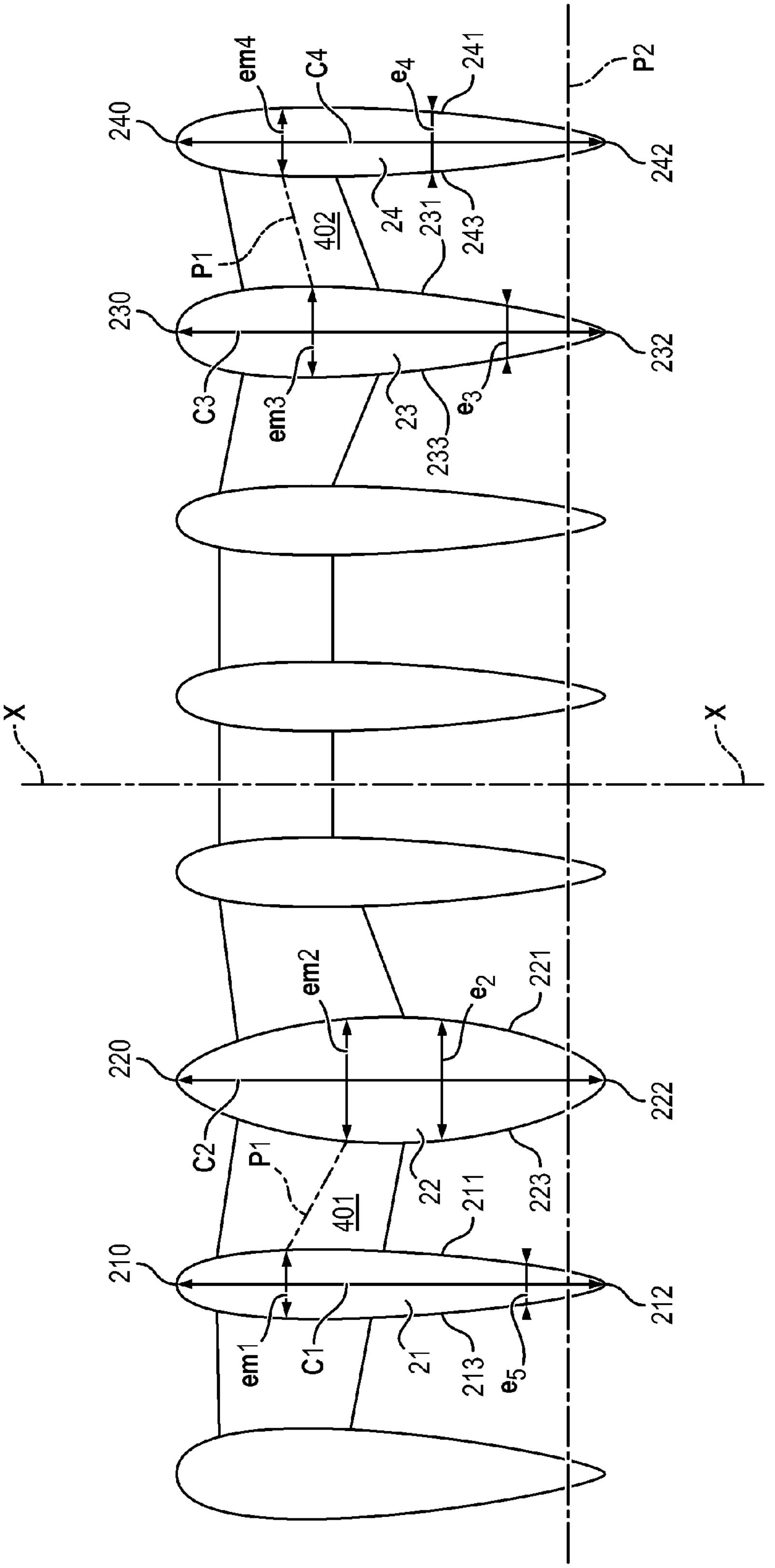
FIG. 5 is a circumferentially developed section of a second exemplary embodiment of a gas turbine engine intermediate casing according to the invention.
Figure 6:
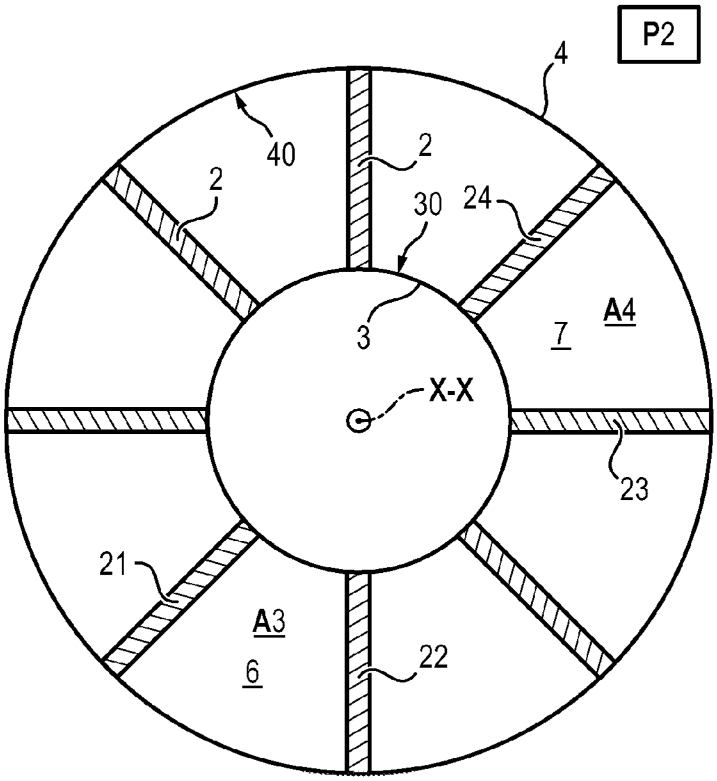
FIG. 6 is a view in a second transverse section plane perpendicular to the longitudinal axis of a third exemplary embodiment of a gas turbine engine intermediate casing according to the invention.

With reference to FIGS. 4 to 6, an intermediate casing 1 is a structural gas turbine engine part, interposed between two rotors (not shown) of the gas turbine engine, said rotors being configured to be rotated at different speeds. For example the intermediate casing 1 can extend between a low-pressure compressor and a high-pressure compressor of a two-spool, double flow, direct drive gas turbine engine. Alternatively, in a three-spool gas turbine engine or in a geared gas turbine engine, the intermediate casing 1 can extend between the fan and the low-pressure compressor.

As can be seen in FIGS. 4 to 6, the intermediate casing 1 has a longitudinal axis X-X. The intermediate casing 1 further comprises:

an inner wall 3 having an outer radial surface 30 with respect to the longitudinal axis X-X, an outer wall 4 having an inner radial surface 40 with respect to the longitudinal axis X-X, facing the outer radial surface 30, and a first arm 21, a second arm 22, a third arm 23, and a fourth arm 24 extending radially from the outer radial surface 30 to the inner radial surface 40.

The arms 21, 22, 23, 24 allow forces to transit to the structural and stator portions of the gas turbine engine (not shown), which are connected to the inner wall 3 and to the outer wall 4. Moreover, the arms 21, 22, 23, 24 form an aerodynamic fairing for the passage of utilities (not shown).

Moreover, the intermediate casing 1 allows slowing an airflow passing through it. To this end, it generally has a gooseneck (or swanneck) structure in which a cross section for passage of the airflow at the inlet of the intermediate casing 1 is smaller than a passage cross section of the airflow at the outlet of the intermediate casing 1. In addition, passages for the airflow are provided between the arms 21, 22, 23, 24. More precisely, the outer radial surface 30, the inner radial surface 40, the first arm 21 and the second arm 22 define between them a first space 6, and the outer radial surface 30, the inner radial surface 40, the third arm 23 and the fourth arm 24 define between them a second space 7.

In an advantageous embodiment, the second arm 22 and the third arm 23 are the same, so that the first space 6 and the second space 7 are adjacent in a circumferential direction around the longitudinal axis X-X.

In a first section plane P1 of the intermediate casing 1, perpendicular to the longitudinal axis X-X, the first space 6 has a first area A1, and the second space 7 has a second area A2. This is particularly visible in FIG. 4, which is a view of the intermediate casing 1 in the first section plane P1. Moreover, the outer radial surface 30 and the inner radial surface 40 are separated, in the first space 6 and in the first section plane P1, by a radial distance D1 of the first space, while the outer radial surface 30 and the inner radial surface 40 are separated, in the second space 7 and in the first section plane P1, by a radial distance D2 of the second space. Here the concept of "radial" is defined with respect to the longitudinal axis X-X.

In addition, as can be seen in FIG. 4, the inner radial surface 30 and/or the outer radial surface 40 have, in the first section plane P1 profiles adapted so that:

the first area A1 and the second area A2 are substantially identical, and the radial distance D1 of the first space and the radial distance D2 of the second space are different.

In this manner, despite the difference of the thicknesses of the arms 21, 22, 23, 24, the passage cross section of the flow within the intermediate casing is identical over all of said intermediate casing 1, at least at the first section plane P1, which allows greater control of the slowing of the flow circulating through the intermediate casing 1. Advantageously, only one of the two radial surfaces 30, 40, for example the inner radial surface 40 as can be seen in FIG. 4, has different inter-arm profiles around the longitudinal axis X-X, and is dimensioned so that its profile is adapted to the different geometries of the arms 21, 22, 23, 24. Indeed, this is an intermediate casing 1 element that is easy to design and/or to profile during the manufacture and/or the maintenance of the gas turbine engine. In addition it simplifies the manufacture of the intermediate casing 1, while allowing attaining the desired effect of homogenizing the flow.

In any case, as can be seen in FIG. 4, the thicker an arm 21, 22, 23, 24 is, the greater the radial distance D1 taken near this arm 21, 22, 23, 24 is, and conversely. More precisely, the loss of circumferential space caused by the size of an arm 21, 22, 23, 24, is compensated by the radial profiling of the radial surfaces 30, 40, of the walls 3, 4 sufficiently close to said arms 21, 22, 23, 24.

In an embodiment illustrated in FIG. 4, the profile of the inner radial surface 40 (illustrated in solid lines) has, in the first section plane P1, an additional concavity 401, 402, 403, 404 with respect to a circular profile (illustrated in dotted lines). This concavity 401, 402, 403, 404 forms a hollowing, the depth of which depends on the thickness of the arm 21, 22, 23, 24 closest to said hollowing. The greater the thickness of the arm 21, 22, 23, 24 is compared to the mean of the thicknesses of the arms 21, 22, 23, 24, the deeper the concavity 401, 402, 403, 404 is. Conversely, if the thickness of the arm 21, 22, 23, 24 is small compared to the means of the thicknesses of the arms 21, 22, 23, 24, the concavity 401, 402, 403, 404 is then opposite to the circular concavity, as can be seen in FIG. 4. Advantageously, the profile of the outer wall 40 comprises several additional concavities 401, 402, 403, 404 with respect to a circular profile, for example concavities 401, 402 with the same orientation and deeper than the circular profile, and concavities 403, 404 with an orientation opposite to the circular profile. This is not limiting, however, because in another embodiment, alternatively or in combination, the profile of the outer radial wall 30 has, in the first section plane, an additional concavity 401, 402, 403, 404 with respect to a circular profile.

With reference to FIG. 5, which is an unfolded view of the intermediate casing 1 in a circumferential three-dimensional surface with a circular cross section, taken around the longitudinal axis X-X, each of the arms 21, 22, 23, 24 has a plurality of thicknesses e1, e2, e3, e4 along the longitudinal axis X-X. More precisely, each arm 21, 22, 23, 24 has a chord C1, C2, C3, C4 joining a leading edge 210, 220, 230, 240 to a trailing edge 212, 222, 232, 242 of an aerodynamic profile of said arm 21, 22, 23, 24, in a plane substantially parallel to the mean flow within the intermediate casing 1. Each thickness e1, e2, e3, e4 is therefore taken perpendicular to the chord C1, C2, C3, C4, along the longitudinal axis X-X, between a pressure side 211, 221, 231, 241 and a suction side 213, 223, 233, 243 of the aerodynamic profile of the arm 21, 22, 23, 24. Among the plurality of thicknesses e1, e2, e3, e4, there exists a maximum thickness em1, em2, em3, em4, the position of which along the chord C1, C2, C3, C4 can be different from one arm 21, 22, 23, 24 to another, as can be seen in FIG. 5. Yet, in an advantageous embodiment of the intermediate casing, a profiling of the walls 30, 40 as previously described is produced in the inter-arm space, at the respective maximum thicknesses em1, em2, em3, em4 of the arms 21, 22, 23, 24. In other words, the first section plane P1 previously described passes through:

- the first arm 21 and the second arm 22 at a respective maximum thickness em1, em2 of the first arm 21 and of the second arm 22, and/or
- the third arm 23 and the fourth arm 24 at a respective maximum thickness em3, em4 of the third arm 23 and of the fourth arm 24.

Indeed, it is at the maximum thickness em1, em2, em3, em4 of the arms 21, 22, 23, 24 that the reduction in the flow passage cross-section is greatest. Thus it is there that it is most advantageous to profile the radial surfaces 30, 40 of the walls 3, 4 so as to ensure that the area A1, A2 of the first passage 6 and of the second passage 7 are identical, by modifying the radial distance D1, D2 separating the walls from one another.

With reference to FIGS. 5 and 6, in a second section plane P2 of the intermediate casing 1, perpendicular to the longitudinal axis X-X, and offset with respect to the first section plane P1 along the longitudinal axis X-X, the first space 6 has a third area A3, and the second space 7 has a fourth area A4. In one embodiment, the third area A3 and the fourth area A4 are substantially identical, and the inner radial surface 30 as well as the outer radial surface 40 have, in the second section plane P2, circular profiles. Indeed, as can be seen in FIG. 5, it is not necessary to modify the profile of the radial surfaces 30, 40 of the walls 3, 4 over the entire length of the arms 21, 22, 23, 24, along the longitudinal axis X-X. Indeed, the aerodynamic profiles of the arms 21, 22, 23, 24 are substantially identical at positions sufficiently distant from the respective maximum thicknesses em1, em2, em3, em4 of the arms 21, 22, 23, 24, along the longitudinal axis X-X. Consequently, the flow is homogeneous and uniform when passing the second section plane P2, without it being necessary to modify the profile of the radial surfaces 30, 40 of the walls 3, 4.

Manufacturing Method

Figure 7:
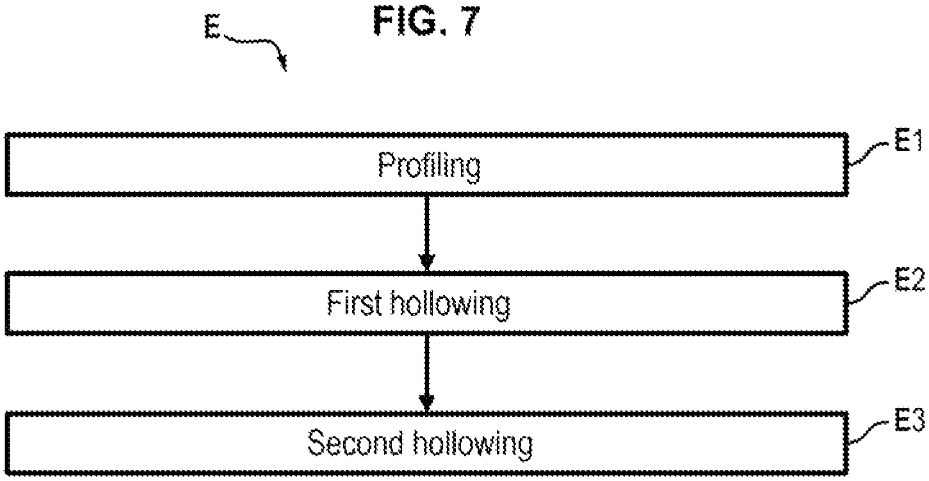
FIG. 7 is a flowchart detailing the steps of a first exemplary implementation of a manufacturing method according to the invention.
Figure 8:
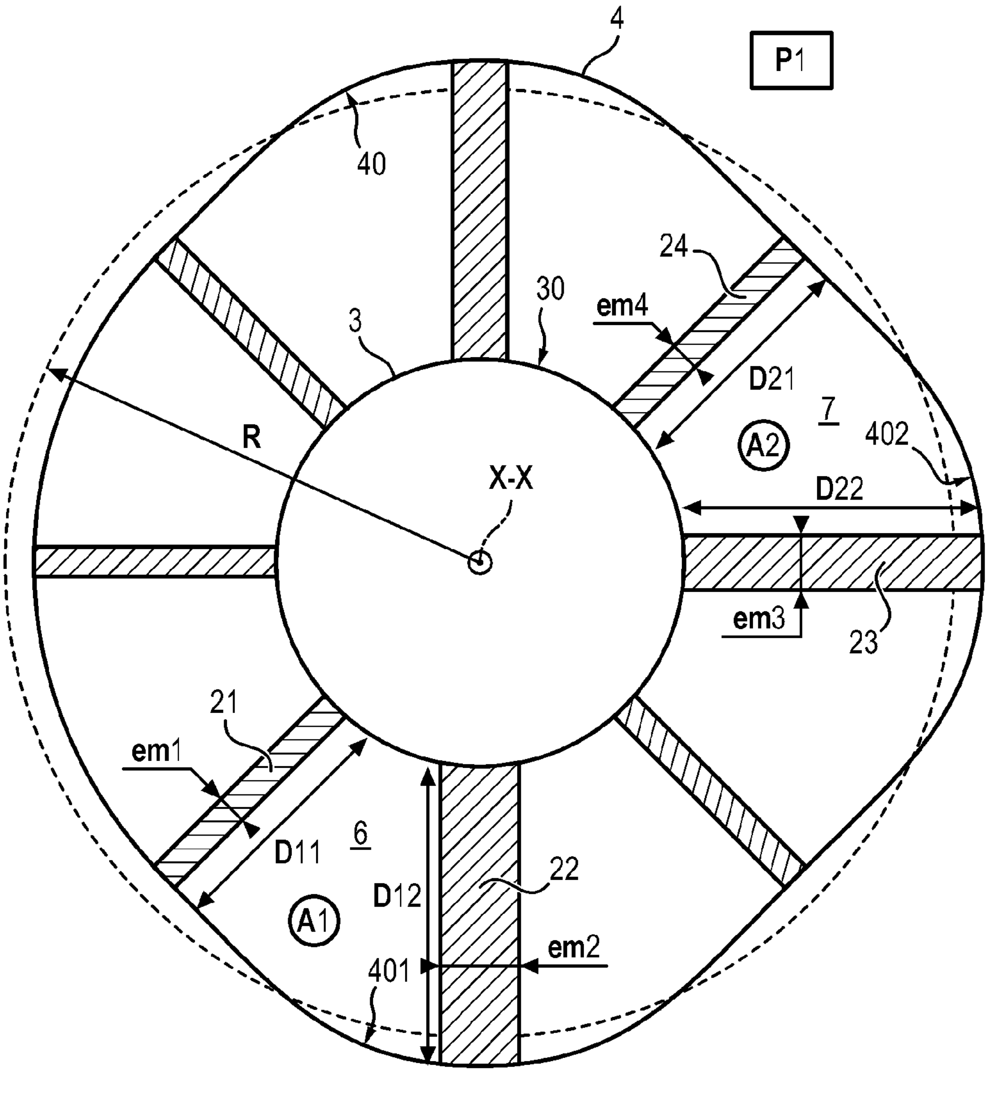
FIG. 8 is a view in a primary section plane of an intermediate casing produced by means of a second exemplary implementation of a manufacturing method according to the invention.

With reference to FIGS. 7 and 8, a manufacturing method E for an intermediate casing 1 of a gas turbine engine will now be described.

The intermediate casing 1 has a longitudinal axis X-X, and further comprises:

- an inner wall 3 having an outer radial surface 30 with respect to the longitudinal axis X-X,
- an outer wall 4 having an inner radial surface 40 with respect to the longitudinal axis X-X, facing the outer radial surface 30, and
- a first arm 21, a second arm 22, a third arm 23, and a fourth arm 24 extending radially from the outer radial surface 30 to the inner radial surface 40.

Moreover, the outer radial surface 30, the inner radial surface 40, the first arm 21 and the second arm 22 define between them a first space 6, and the outer radial surface 30, the inner radial surface 40, the third arm 23 and the fourth arm 24 define between them a second space 7. And, in a first section plane P1 of the intermediate casing 1, perpendicular to the longitudinal axis X-X, the first space 6 has a first area A1, and the second space 7 has a second area A2. Moreover, the outer radial surface 30 and the inner radial surface 40 are separated, in the first space 6 and in the first section plane P1, by a radial distance D1 of the first space, while the outer radial surface 30 and the inner radial surface 40 are separated, in the second space 7 and in the first section plane P1, by a radial distance D2 of the second space. In addition, each of the arms 21, 22, 23, 24 has a plurality of thicknesses along the longitudinal axis X-X. More precisely, each arm 21, 22, 23, 24 has a chord joining a leading edge to a trailing edge of an aerodynamic profile of said arm 21, 22, 23, 24, in a plane substantially parallel to the mean flow within the intermediate casing 1. Each thickness is therefore taken perpendicular to the chord along the longitudinal axis X-X, between a pressure side and a suction side of the aerodynamic profile of the arm 21, 22, 23, 24. Among the plurality of thicknesses, there exists as maximum thickness em1, em2, em3, em4, the position of which along the chord can be different from one arm 21, 22, 23, 24 to another.

As can be seen in FIG. 7, the method E comprises a step E1 of profiling the inner radial surface 30 and/or the outer radial surface 40 so that, in the first section plane P1:

- the first area A1 and the second area A2 are substantially identical, and
- the radial distance D1 of the first space and the radial distance D2 of the second space are different.

This profiling provides the intermediate casing 1 with the same advantages as those previously described. Indeed, an airflow circulating through an intermediate casing 1, produced by means of such a manufacturing method E, has a limited number of Mach number heterogeneities around the longitudinal axis X-X. As a matter of fact, the intermediate casing 1 no longer has cross section size disparities from one flow channel to another. The Mach number then decreases uniformly along the longitudinal axis X-X, at the inner wall 3 and/or at the outer wall 4, and this regardless of the inter-arm flow channel considered.

As is also visible in FIG. 8, in one embodiment, the manufacturing method E further comprises the steps of forming E2 of a first hollowing 401 and of forming E3 of a second hollowing 402 in the inner wall 3 and/or the outer wall 4 of the intermediate casing 1. More precisely, the first hollowing 401 is then formed so that the outer radial surface 30 and the inner radial surface 40 are separated, in the first space 6 and in the first section plane P1, by:

- a first radial distance D11 of the first space, with respect to the longitudinal axis X-X, the first radial distance D11 of the first space extending from a point of the outer radial surface 30 and/or of the inner radial surface 40 outside the first hollowing 401, and
- a second radial distance D12 of the first space, with respect to the longitudinal axis X-X, the second radial distance D12 of the first space extending from a point of the outer radial surface 30 and/or of the inner radial surface 40 into a first hollowing 401.

In addition, these radial distances D11, D12 are formed so that the gap between the first radial distance D11 of the first space and the second radial distance D12 of the first space is an increasing function of the gap between:

- the thickness em1, em2 of the first arm 21 and/or of the second arm 22, and
- the mean of the respective maximum thicknesses em1, em2, em3, em4 of the first arm 21, of the second arm 22, of the third arm 23 and of the fourth arm 24.

In the same manner, the second hollowing 402 is formed so that the outer radial surface 30 and the inner radial surface 40 are separated, in the second space 7 and in the first section plane P1, by:

- a first radial distance D21 of the second space, with respect to the longitudinal axis X-X, the first radial distance D21 of the second space extending from a point of the outer radial surface 30 and/or from the inner radial surface 40 outside of the second hollowing 402, and
- a second radial distance D22 of the second space, with respect to the longitudinal axis X-X, the second radial distance D22 of the second space extending from a point of the outer radial surface 30 and/or of the inner radial surface 40 passing through the second hollowing 402.

In addition, these radial distances D21, D22 are produced so that the gap between the first radial distance D21 of the second space and the second radial distance D22 of the second space is an increasing function of the gap between:

- the maximum thickness em3, em4 of the third arm 23 and/or of the fourth arm 24, and
- the mean of the respective maximum thicknesses em1, em2, em3, em4 of the first arm 21, of the second arm 22, of the third arm 23 and of the fourth arm 24.

Due to these hollowing steps E2, E3, an intermediate casing 1 like that illustrated in FIG. 4 or 8 can be obtained. In these figures, the dotted lines show a circular profile of the inner radial surface 40, in the first section plane P1. The radius R of this profile depends on the mean of the maximum thicknesses em1, em2, em3, em4 of the arms 21, 22, 23, 24 of the intermediate casing 1. More precisely, this radius R is determined so that, if the arms 21, 22, 23, 24 all had the same maximum thickness em1, em2, em3, em4, equal to the mean of the maximum thicknesses em1, em2, em3, em4, then this circular profile of the inner radial surface would ensure that the Mach number decreased uniformly along the longitudinal axis X-X, at the inner wall and/or at the outer wall 4, and this regardless of the inter-arm flow channel considered. The solid line, for its part, shows the profile of the inner radial wall 40 obtained following the hollowing steps E2, E3 previously described. As can be seen in these figures, the smaller the gap between the maximum thickness em1, em2, em3, em4 of an arm 21, 22, 23, 24 and the mean of the maximum thicknesses em1, em2, em3, em4 is, even negative in the case where the maximum thickness of the arm em1, em2, em3, em4 is less than the mean of the maximum thicknesses em1, em2, em3, em4, the smaller the radial distance D1, D2 of a space is. Conversely, the greater the gap between the maximum thickness of an arm em1, em2, em3, em4 and the mean of the maximum thicknesses em1, em2, em3, em4 is, the greater the radial distance D1, D2 of a space is. The profile of the inner radial surface 40 obtained is therefore non-symmetrical and has a plurality of additional concavities 401, 402, 403, 404 with respect to a circular profile. It should be noted that the profile of the outer radial wall 30 could be modified using the same design logic, and with the same effects. The fact that the airflow speeds are different in proximity to the inner radial surface 40 and to the outer radial surface 30 should however be taken into account. In addition, aerodynamic friction can be specific, particularly due to the gooseneck shape. The depth of the hollowings in the outer radial surface 30 is thus adjusted in consequence.

In one embodiment, as can be seen in FIG. 5, the hollowings 401, 402 previously described can be formed so that:

- the first hollowing 401 is centered at a section plane P1 passing through the first arm 21 and the second arm 22 at the respective maximum thickness em1, em2 of the first arm 21 and of the second arm 22, and
- the second hollowing 402 is centered at a section plane P1 passing through the third arm 23 and the fourth arm 24 at the respective maximum thickness em3, em4 of the third arm 23 and of the fourth arm 24.

It is then possible to obtain an intermediate casing 1 like that illustrated in FIG. 5. As can be seen in this figure, the hollowings 401, 402 are formed on either side of a line joining the positions of the maximum thicknesses em1, em2, em3, em4 of the arms 21, 22, 23, 24 along the longitudinal axis X-X. Advantageously, the hollowings 401, 402 are formed in a substantially rectangular zone of the inner radial surface 30 and/or of the outer radial surface 40, as can be seen in FIG. 5. Even more advantageously, this rectangular zone has a width amounting to approximately 10% of the chord C1, C2, C3, C4 of an adjacent arm 21, 22, 23 24, taken in a plane substantially parallel to the mean flow within the intermediate casing 1. In this manner, the manufacturing method E involves a limited modification of the walls 3, 4 of the intermediate casing 1. In addition, the position of the hollowings 401, 402 is optimized depending on the position of the maximum thicknesses em1, em2, em3, em4, along the longitudinal axis X-X.

The invention claimed is:

1. An intermediate casing extending along a longitudinal axis and comprising:

an inner wall having an outer surface extending along the longitudinal axis, the outer surface having a first profile in a first plane orthogonal to the longitudinal axis;

an outer wall having an inner surface extending along the longitudinal axis, the inner surface facing the outer surface and having a second profile in the first plane;

a first arm extending radially from the outer surface to the inner surface such as to present a first radial extent in the first plane, the first arm having a first circumferential thickness in the first plane;

a second arm extending radially from the outer surface to the inner surface such as to present a second radial extent in the first plane, the second arm having a second circumferential thickness in the first plane;

a third arm extending radially from the outer surface to the inner surface such as to present a third radial extent in the first plane, the third arm having a third circumferential thickness in the first plane;

a fourth arm extending radially from the outer surface to the inner surface such as to present a fourth radial extent in the first plane, the fourth arm having a fourth circumferential thickness in the first plane;

wherein the outer surface, the inner surface, the first arm and the second arm delimit a first cavity, the first cavity having a first area in the first plane, the outer surface being separated from the inner surface, within the first cavity, by a first distance taken radially in the first plane;

wherein the outer surface, the inner surface, the third arm and the fourth arm delimit a second cavity, the second cavity having a second area in the first plane, the outer surface being separated from the inner surface, within the second cavity, by a second distance taken radially in the first plane; and wherein the first profile and the second profile are configured such that the first area is substantially identical to the second area, the first distance is different from the second distance, an extent of at least one thickness among the first circumferential thickness, the second circumferential thickness, the third circumferential thickness, and the fourth circumferential thickness is different from an extent of another thickness among the first circumferential thickness, the second circumferential thickness, the third circumferential thickness, and the fourth circumferential thickness, and the first radial extent, the second radial extent, the third radial extent and the fourth radial extent are proportionate to the first circumferential thickness, the second circumferential thickness, the third circumferential thickness and the fourth circumferential thickness, respectively.

2. The intermediate casing of claim 1, wherein the first circumferential thickness is a maximum circumferential thickness of the first arm along the longitudinal axis, the second circumferential thickness is a maximum circumferential thickness of the second arm along the longitudinal axis, the third circumferential thickness is a maximum circumferential thickness of the third arm along the longitudinal axis and/or the fourth circumferential thickness is a maximum circumferential thickness of the fourth arm along the longitudinal axis.

3. The intermediate casing of claim 1, wherein the first cavity has a third area in a second plane and the second cavity has a fourth area in the second plane, the second plane being orthogonal to the longitudinal axis and offset with respect to the first plane along the longitudinal axis, the third area being substantially identical to the fourth area; and wherein the outer surface has a third profile in the second plane and the inner surface has a fourth profile in the second plane, each of the third profile and the fourth profile being circular.

4. The intermediate casing of claim 1, wherein the first profile has an additional concavity with respect to a circular profile.

5. The intermediate casing of claim 1, wherein the second profile has an additional concavity with respect to a circular profile.

6. The intermediate of claim 1, wherein the second arm and the third arm are a same arm.

7. A gas turbine engine comprising:

the intermediate casing of claim 1;

a first rotor rotatable with respect to the intermediate casing; and a second rotor rotatable with respect to the intermediate casing;

wherein the intermediate casing is interposed between the first rotor and the second rotor.

8. A method of manufacturing an intermediate casing, the intermediate casing extending along a longitudinal axis and comprising:

an inner wall having an outer surface extending along the longitudinal axis;

an outer wall having an inner surface extending along the longitudinal axis, the inner surface facing the outer surface;

a first arm extending radially from the outer surface to the inner surface such as to present a first radial extent in a first plane, the first arm having a first circumferential thickness in the first plane, the first plane being orthogonal to the longitudinal axis;

a second arm extending radially from the outer surface to the inner surface such as to present a second radial extent in the first plane, the second arm having a second circumferential thickness in the first plane;

a third arm extending radially from the outer surface to the inner surface such as to present a third radial extent in the first plane, the third arm having a third circumferential thickness in the first plane;

a fourth arm extending radially from the outer surface to the inner surface such as to present a fourth radial extent in the first plane, the fourth arm having a fourth circumferential thickness in the first plane;

wherein the outer surface, the inner surface, the first arm and the second arm delimit a first cavity, the first cavity having a first area in the first plane, the outer surface being separated from the inner surface, within the first cavity, by a first distance taken radially in the first plane;

wherein the outer surface, the inner surface, the third arm and the fourth arm delimit a second cavity, the second cavity having a second area in the first plane, the outer surface being separated from the inner surface, within the second cavity, by a second distance taken radially in the first plane;

wherein the method comprises profiling the outer surface such that the outer surface has a first profile in the first plane and profiling the inner surface such that the inner surface has a second profile in the first plane;

wherein profiling the outer surface and profiling the inner surface are such that the first area is substantially identical to the second area, the first distance is different from the second distance, an extent of at least one thickness among the first circumferential thickness, the second circumferential thickness, the third circumferential thickness and the fourth circumferential thickness is different from an extent of another thickness among the first circumferential thickness, the second circumferential thickness, the third circumferential thickness and the fourth circumferential thickness, and the first radial extent, the second radial extent, the third radial extent and the fourth radial extent are proportionate to the first circumferential thickness, the second circumferential thickness, the third circumferential thickness and the fourth circumferential thickness, respectively.

9. The method of claim 8, wherein each of the first arm, the second arm, the third arm, and the fourth arm of the intermediate casing presents a maximum circumferential thickness along the longitudinal axis;

wherein the method further comprising:

forming a first hollowing in the outer wall and/or a second hollowing in the inner wall, wherein a first segment extends radially, within the first cavity and the first plane, from the outer surface to the inner surface within the first hollowing and/or the second hollowing, the first segment having a first length, and a second segment extends radially, within the first cavity and the first plane, from the outer surface to the inner surface outside of the first hollowing and/or of the second hollowing, the second segment having a second length, the forming being such that a difference between the first length and the second length is proportionate to a difference between a maximum thickness of the first arm and/or of the second arm and a mean of the respective maximum thickness of the first arm, of the second arm, of the third arm and of the fourth arm; and forming a third hollowing in the outer wall and/or a fourth hollowing in the inner wall, wherein a third segment extends radially, within the second cavity and the first plane, from the outer surface to the inner surface within the third hollowing and/or the fourth hollowing, the third segment having a third length, and a fourth segment extends radially, within the second cavity and the first plane, from the outer surface to the inner surface outside of the third hollowing and/or of the fourth hollowing, the fourth segment having a fourth length, the forming being such that a difference between the third length and the fourth length is proportionate to a difference between a maximum thickness of the third arm and/or of the fourth arm and a mean of the respective maximum thickness of the first arm, of the second arm, of the third arm and of the fourth arm.

10. The method of claim 9, wherein the first hollowing and/or the second hollowing is centered at a plane orthogonal to the longitudinal axis and passing through the first arm and the second arm at their respective maximum thickness, and the third hollowing and/or the fourth hollowing is centered at a plane orthogonal to the longitudinal axis and passing through the third arm and the fourth arm at the respective maximum thickness.

* * * * *